(12) United States Patent
Iida et al.

(10) Patent No.: US 6,523,038 B1
(45) Date of Patent: Feb. 18, 2003

(54) RETRIEVAL METHOD AND APPARATUS FOR A MONITORING SYSTEM

(75) Inventors: Naoto Iida, Tokyo (JP); Takanori Fujisawa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/468,293

(22) Filed: Dec. 21, 1999

(30) Foreign Application Priority Data

Dec. 21, 1998 (JP) .......................................... 10-363568
Dec. 22, 1998 (JP) .......................................... 10-365554

(51) Int. Cl.⁷ ............................................ G06F 17/00
(52) U.S. Cl. ...................................... 707/100; 714/100
(58) Field of Search ................................ 707/100–102, 707/104; 714/100

(56) References Cited

U.S. PATENT DOCUMENTS

| 4,396,977 A |   | 8/1983  | Slater et al. ............ 364/188 |
| 4,708,427 A | * | 11/1987 | Ejiri et al. ............ 350/96.2 |
| 5,522,026 A | * | 5/1996  | Records et al. ......... 395/161 |
| 5,581,242 A |   | 12/1996 | Arita et al. ............ 340/691 |
| 5,812,394 A |   | 9/1998  | Lewis et al. ............ 364/146 |
| 6,184,829 B1| * | 2/2001  | Stilp .................... 342/387 |

FOREIGN PATENT DOCUMENTS

| EP | 0 528 396 A2 | 2/1993 |
| EP | 0 694 825 A2 | 1/1996 |
| JP | 4-204492     | 7/1992 |
| JP | 10-27015     | 1/1998 |
| JP | 10-111712    | 4/1998 |

* cited by examiner

*Primary Examiner*—James P. Trammell
*Assistant Examiner*—Mary Wang
(74) *Attorney, Agent, or Firm*—Whithman, Curtis & Christofferson, PC

(57) ABSTRACT

A method for retrieving information related to a desired item from a database storing information which are collected from a system to be monitored is disclosed. A plurality of states of the system are displayed in time sequence on screen of a display. Each of the states is represented by a plurality of items of collected information. When inputting a desired item of a state selected from the states displayed on the screen, a state of the system is retrieved from the database based on the desired item, and the retrieved state is displayed on the screen.

1 Claim, 17 Drawing Sheets

| | TIME | KIND OF ALERT | TYPE OF DEVICE | OCCURRENCE/ RESTORATION |
|---|---|---|---|---|
| DATA 1007 | 12:20 | B | b | RESTORATION |
| DATA 1006 | 12:10 | A | b | RESTORATION |
| DATA 1005 | 12:00 | B | a | RESTORATION |
| DATA 1004 | 11:50 | B | a | OCCURRENCE |
| DATA 1003 | 11:40 | B | b | OCCURRENCE |
| DATA 1002 | 11:30 | A | b | OCCURRENCE |
| DATA 1001 | 11:20 | A | a | OCCURRENCE |

| | TIME | KIND OF ALERT | TYPE OF DEVICE | OCCURRENCE/ RESTORATION |
|---|---|---|---|---|
| * DATA 1008 | 12:30 | A | a | RESTORATION |
| DATA 1007 | 12:20 | B | b | RESTORATION |
| DATA 1006 | 12:10 | A | b | RESTORATION |
| DATA 1005 | 12:00 | B | a | OCCURRENCE |
| DATA 1004 | 11:50 | B | a | OCCURRENCE |
| DATA 1003 | 11:40 | B | b | OCCURRENCE |
| DATA 1002 | 11:30 | A | b | OCCURRENCE |
| DATA 1001 | 11:20 | A | a | OCCURRENCE |

PULLDOWN MENU  A2
- SEARCH
  - OCCURRENCE
  - RESTORATION
  - OTHERS

| | TIME | KIND OF ALERT | TYPE OF DEVICE | OCCURRENCE/ RESTORATION |
|---|---|---|---|---|
| * DATA 1008 | 12:30 | A | a | RESTORATION |
| DATA 1007 | 12:20 | B | b | RESTORATION |
| DATA 1006 | 12:10 | A | b | RESTORATION |
| DATA 1005 | 12:00 | B | a | RESTORATION |
| DATA 1004 | 11:50 | B | a | OCCURRENCE |
| DATA 1003 | 11:40 | B | b | OCCURRENCE |
| DATA 1002 | 11:30 | A | b | OCCURRENCE |
| * DATA 1001 | 11:20 | A | a | OCCURRENCE | ← FOUND

FIG.5A

| D1 | TIME | KIND OF ALERT | TYPE OF DEVICE | OCCURRENCE/ RESTORATION |
|---|---|---|---|---|
| DATA 2006 | 12:00 | A | b | OCCURRENCE |
| DATA 2005 | 12:00 | B | a | OCCURRENCE |
| DATA 2004 | 11:00 | B | a | RESTORATION |
| DATA 2003 | 11:00 | B | b | RESTORATION |
| DATA 2002 | 11:00 | A | b | RESTORATION |
| DATA 2001 | 11:00 | A | a | RESTORATION |

FIG.5B

| D1 | TIME | KIND OF ALERT | TYPE OF DEVICE | OCCURRENCE/ RESTORATION |
|---|---|---|---|---|
| *DATA 2007 | 13:00 | B | b | OCCURRENCE |
| DATA 2006 | 12:00 | A | b | OCCURRENCE |
| DATA 2005 | 12:00 | B | a | OCCURRENCE |
| DATA 2004 | 11:00 | B | a | RESTORATION |
| DATA 2003 | 11:00 | B | b | RESTORATION |
| DATA 2002 | 11:00 | A | b | RESTORATION |
| DATA 2001 | 11:00 | A | a | RESTORATION |

D2
SEARCH
- OCCURRENCE
- RESTORATION
- OTHERS

FIG.5C

| D1 | TIME | KIND OF ALERT | TYPE OF DEVICE | OCCURRENCE/ RESTORATION |  |
|---|---|---|---|---|---|
| *DATA 2007 | 13:00 | B | b | OCCURRENCE |  |
| DATA 2006 | 12:00 | A | b | OCCURRENCE |  |
| DATA 2005 | 12:00 | B | a | OCCURRENCE |  |
| DATA 2004 | 11:00 | B | a | RESTORATION |  |
| *DATA 2003 | 11:00 | B | b | RESTORATION | ← FOUND |
| DATA 2002 | 11:00 | A | b | RESTORATION |  |
| DATA 2001 | 11:00 | A | a | RESTORATION |  |

| | TIME | KIND OF ALERT | TYPE OF DEVICE | STATION | OCCURRENCE/ RESTORATION |
|---|---|---|---|---|---|
| DATA 3008 | 12:30 | A | a | SELF | RESTORATION |
| DATA 3007 | 12:30 | RECEPTION ERROR | a | SELF | RESTORATION |
| DATA 3006 | 12:20 | A | a | SELF | OCCURRENCE |
| DATA 3005 | 12:20 | RECEPTION ERROR | a | SELF | OCCURRENCE |
| DATA 3004 | 12:10 | RECEPTION ERROR | a | SELF | RESTORATION |
| DATA 3003 | 12:10 | TRANS. ERROR | a | OTHER | RESTORATION |
| DATA 3002 | 12:00 | RECEPTION ERROR | a | SELF | OCCURRENCE |
| DATA 3001 | 12:00 | TRANS. ERROR | a | OTHER | OCCURRENCE |

| | TIME | KIND OF ALERT | TYPE OF DEVICE | STATION | OCCURRENCE/ RESTORATION |
|---|---|---|---|---|---|
| DATA 3008 | 12:30 | A | a | SELF | RESTORATION |
| DATA 3007 | 12:30 | RECEPTION ERROR | a | SELF | RESTORATION |
| DATA 3006 | 12:20 | A | a | SELF | OCCURRENCE |
| DATA 3005 | 12:20 | RECEPTION ERROR | a | SELF | OCCURRENCE |
| DATA 3004 | 12:10 | RECEPTION ERROR | a | SELF | RESTORATION |
| DATA 3003 | 12:10 | TRANS. ERROR | a | OTHER | RESTORATION |
| DATA 3002 | 12:00 | RECEPTION ERROR | a | SELF | OCCURRENCE |
| DATA 3001 | 12:00 | TRANS. ERROR | a | OTHER | OCCURRENCE |

*

E2 → SEARCH · OTHER STA.

FIG.6C

| SELF STATION ALERT | OTHER STATION ALERT |
|---|---|
| * RECEPTION ERROR | TRANSMISSION ERROR |
| RECEPTION ERROR | LINE FAULT |
| RECEPTION ERROR | TRANSMISSION OUTPUT SHUTOFF |
| RECEPTION ERROR | TRANSMISSION OPTICAL OUTPUT SHUTOFF |
| RECEPTION ERROR | TRANSMISSION CLOCK SHUTOFF |
| RECEPTION ERROR | TRANSMITTER PROBLEM |

| | TIME | KIND OF ALERT | TYPE OF DEVICE | STATION | OCCURRENCE/ RESTORATION | |
|---|---|---|---|---|---|---|
| DATA 3008 | 12:30 | A | a | SELF | RESTORATION | |
| DATA 3007 | 12:30 | RECEPTION ERROR | a | SELF | RESTORATION | |
| DATA 3006 | 12:20 | A | a | SELF | OCCURRENCE | |
| DATA 3005 | 12:20 | RECEPTION ERROR | a | SELF | OCCURRENCE | |
| DATA 3004 | 12:10 | RECEPTION ERROR | a | SELF | RESTORATION | |
| DATA 3003 | 12:10 | TRANS. ERROR | a | OTHER | RESTORATION | |
| * DATA 3002 | 12:00 | RECEPTION ERROR | a | SELF | OCCURRENCE | |
| * DATA 3001 | 12:00 | TRANS. ERROR | a | OTHER | OCCURRENCE | ← FOUND |

FIG.7A

| F1 | TIME | TYPE OF DEVICE | STATUS BEFORE CHANGE | STATUS AFTER CHANGE |
|---|---|---|---|---|
| * DATA 4008 | 12:30 | c | A | B |
| DATA 4007 | 12:20 | b | B | A |
| DATA 4006 | 12:10 | b | A | B |
| DATA 4005 | 12:00 | a | B | A |
| DATA 4004 | 11:50 | a | A | B |
| DATA 4003 | 11:40 | b | B | A |
| DATA 4002 | 11:30 | b | A | B |
| DATA 4001 | 11:20 | c | A | B |

FIG.7B

| F1 | TIME | TYPE OF DEVICE | STATUS BEFORE CHANGE | STATUS AFTER CHANGE |
|---|---|---|---|---|
| * DATA 4008 | 12:30 | c | A | B |
| DATA 4007 | 12:20 | b | B | A |
| DATA 4006 | 12:10 | b | A | B |
| DATA 4005 | 12:00 | a | B | A |
| DATA 4004 | 11:50 | a | A | B |
| DATA 4003 | 11:40 | b | B | A |
| DATA 4002 | 11:30 | b | A | B |
| DATA 4001 | 11:20 | c | A | B |

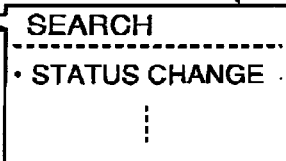

SEARCH
• STATUS CHANGE

FIG.7C

| F1 | TIME | TYPE OF DEVICE | STATUS BEFORE CHANGE | STATUS AFTER CHANGE |
|---|---|---|---|---|
| * DATA 4008 | 12:30 | c | A | B |
| DATA 4007 | 12:20 | b | B | A |
| DATA 4006 | 12:10 | b | A | B |
| DATA 4005 | 12:00 | a | B | A |
| DATA 4004 | 11:50 | a | A | B |
| DATA 4003 | 11:40 | b | B | A |
| DATA 4002 | 11:30 | b | A | B |
| * DATA 4001 | 11:20 | c | A | B |

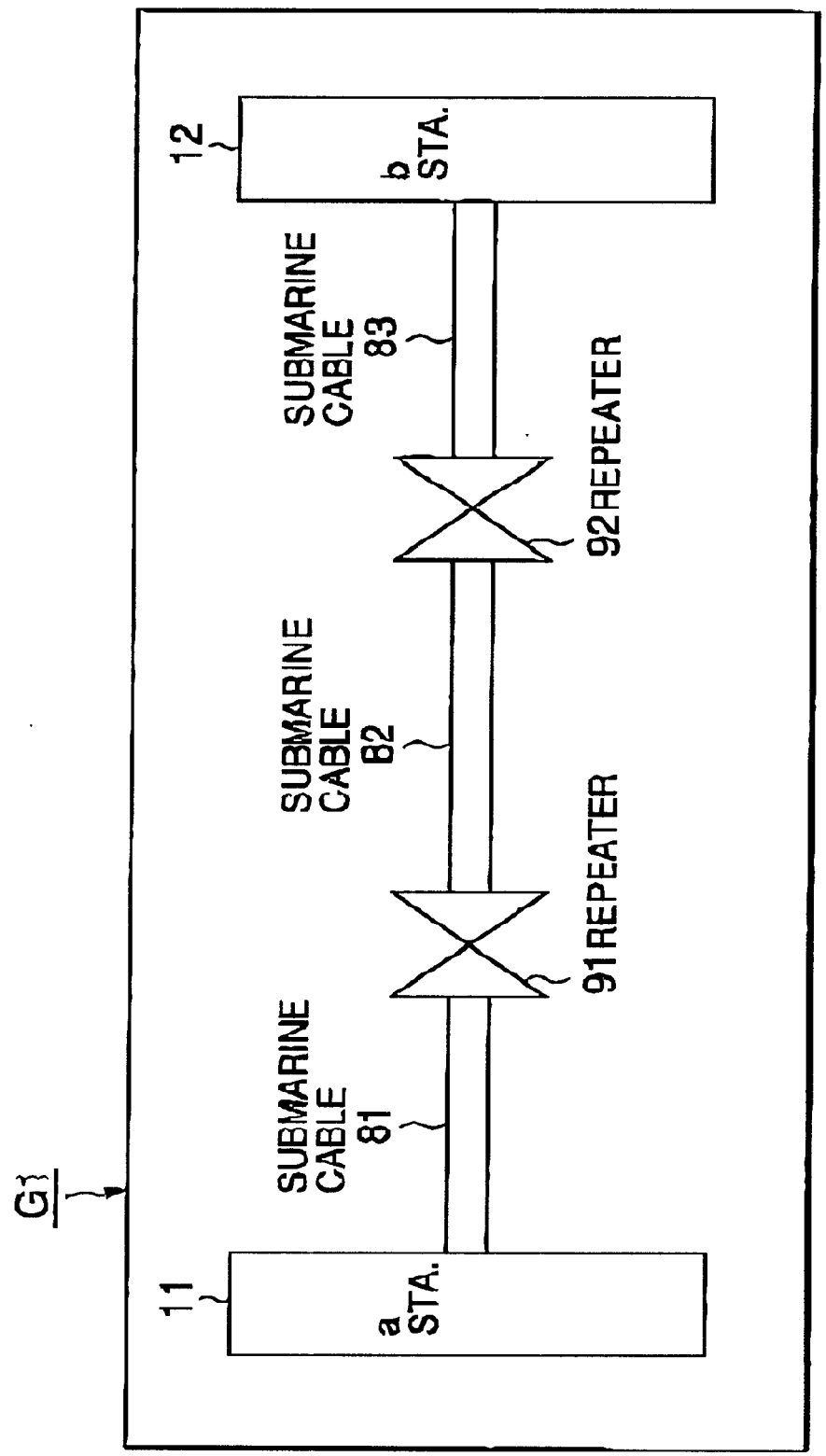

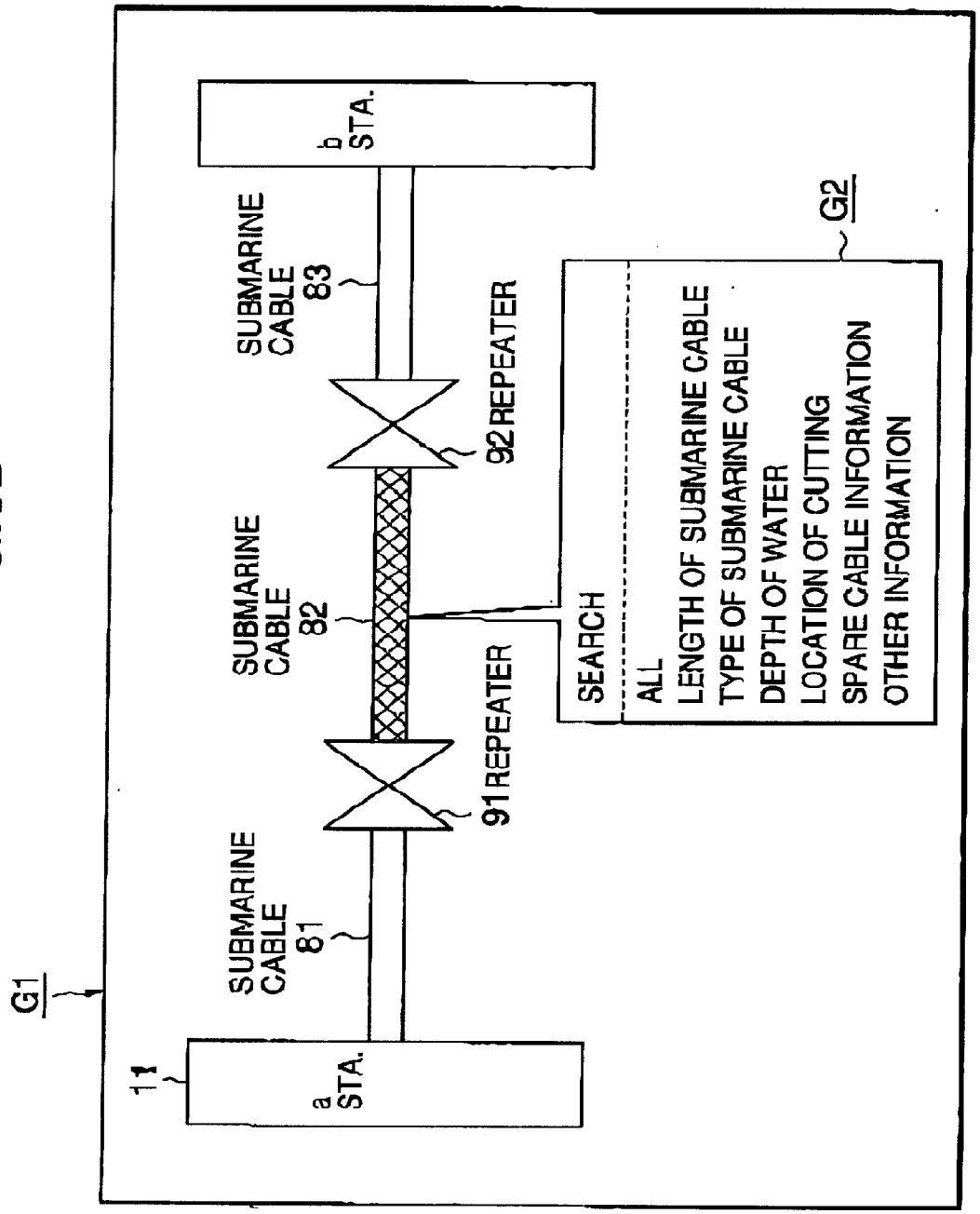

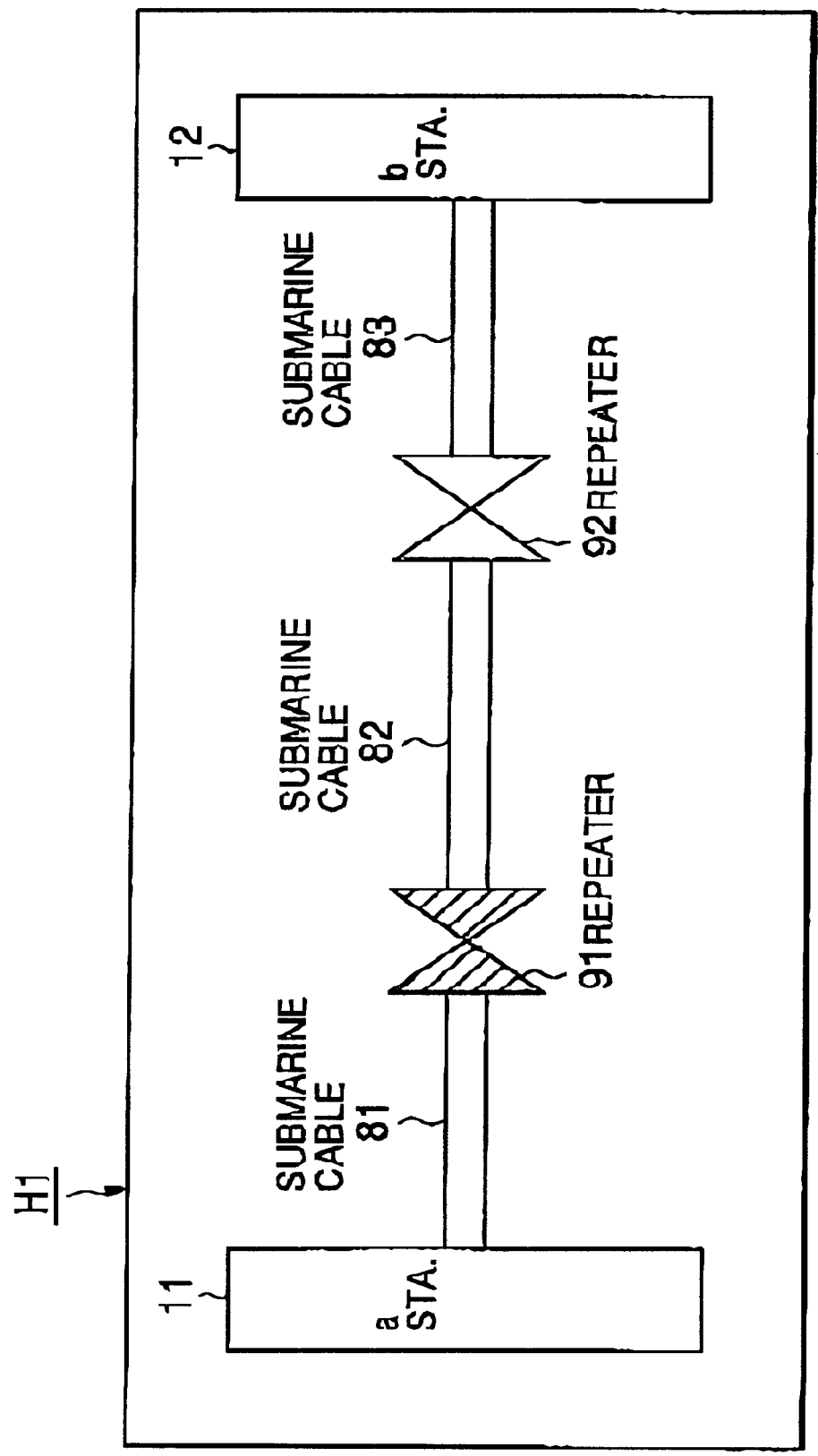

FIG.9C

DETAILS OF REPEATER 91 H3

DETAILS OF REPEATER
NUMBER OF REPEATER : 108B
TYPE OF REPEATER : TYPE-B
DEPTH OF WATER : 2091m
LOCATION OF PROBLEM : 61.27km

DETAILS OF SPARE REPEATER
NUMBER OF REPEATER : 209B
TYPE OF REPEATER : TYPE-B
CHARACTERISTICS : X:2 Y:9 Z:1
STORAGE LOCATION : WAREHOUSE B-BLOCK C
PHONE NUMBER OF STORAGE LOCATION : 123-4567

FAULT LOCATION a STA. — 61.27km → b STA.

OTHER INFORMATION
CHARTERED SHIP SCHEDULE : A-SHIP : OK
: B-SHIP : NG
ESTIMATED TIME REQUIRED FOR RESTORATION : 20DAYS
OTHERS : NONE

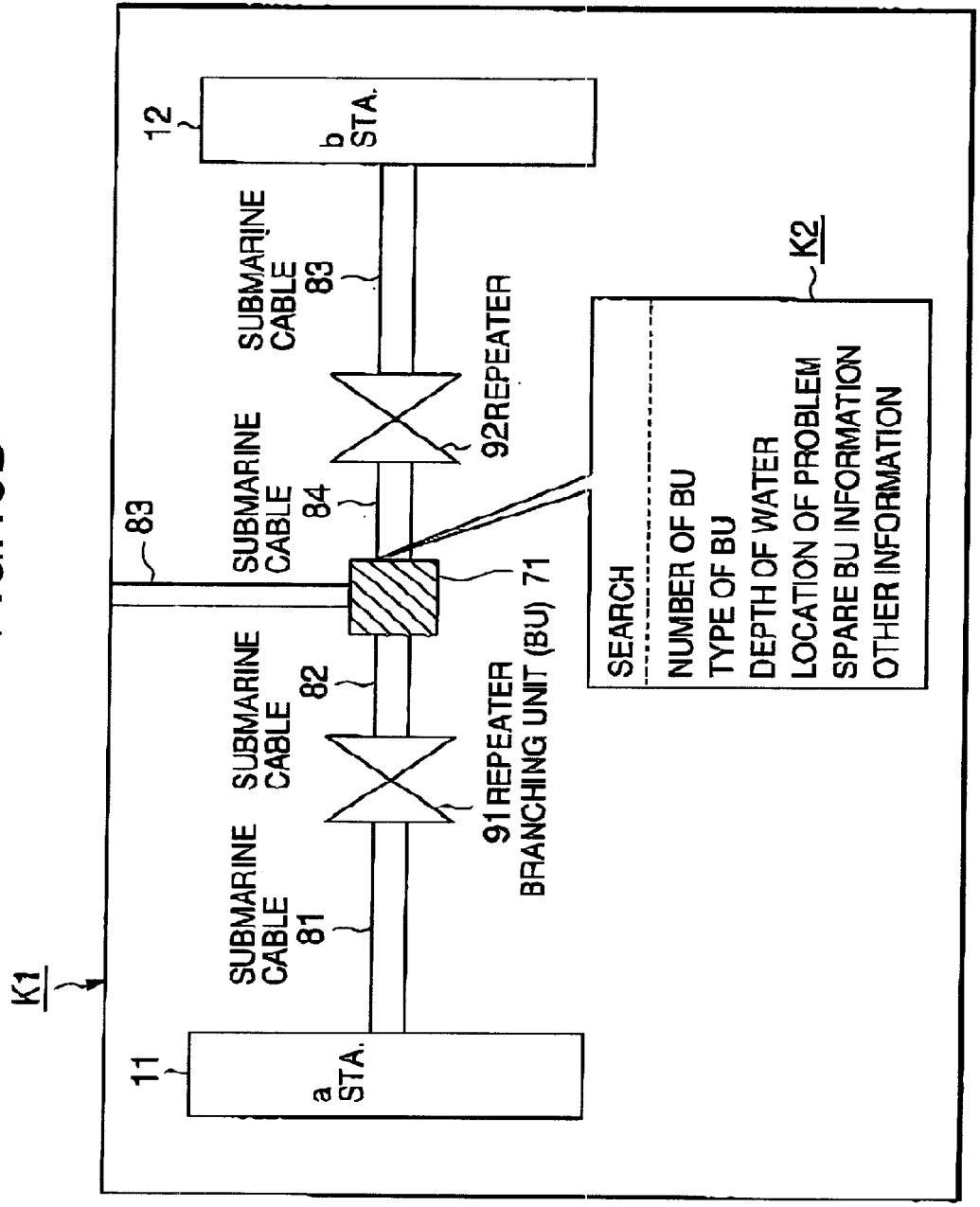

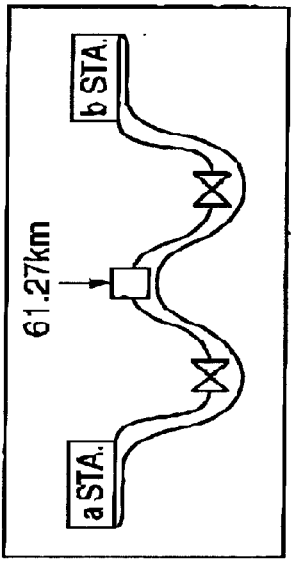

RETRIEVAL METHOD AND APPARATUS FOR A MONITORING SYSTEM

BACKGROUND OF THE INVENTION

1. Field of the Invention

The present invention generally relates to a monitoring system that monitors a system by collecting information from the system and displaying collected information in desired form, and in particular to an information retrieval method and apparatus which can retrieve information related to a desired information item in a desired form.

2. Description of the Related Art

There have proposed several supporting systems to allow easy operability of a monitor system for monitoring a plant.

Japanese Patent Application Laid-open No. 4-204492 discloses a monitor-supporting system which has a function of displaying an alert item related to a desired alert item which is selected by an operator's touch action.

Japanese Patent Application Laid-open No. 10-27015 discloses a status data retrieval system which collects operation data from the plant and retrievably stores it onto a database, from which status data can be retrieved according to a desired condition. This allows current and past operation data to be easily displayed, resulting in reduced burden on an operator and effective troubleshooting Japanese Patent Application Laid-open No. 10-111712 discloses an alert monitor which collects plant data and determines from the plant data whether a fault occurs in the plant. If a fault occurs, the operation history of the fault item is retrievably stored. Therefore, when the same fault occurs, its operation history can be displayed on a monitor screen, allowing rapid and effective restoration.

However, the above prior art Systems cannot provide the alert occurrence/restoration history of a device in which a fault occurs or is restored Further, it cannot be easily determined which one of two stations causes the occurrence of a fault on a cable connecting them. Furthermore, it cannot be easily determined how the operation state of a device in the system has been changed.

In addition, none of the above prior art systems provide a monitor-supporting system for use in a transmission cable system. For example, in the case of a monitor for a submarine cable system composed of submarine cables, repeaters, branching units, and joint boxes, it cannot be easily determined which one of two stations causes the occurrence of a fault on a cable connecting them. Further, it cannot be easily determined how the operation state of a device in the submarine cable system has been changed.

SUMMARY OF THE INVENTION

An object of the present invention is to provide a retrieval method and apparatus which can achieve easy and reliable management of a system.

Another object of the present invention is to provide a retrieval method and apparatus which can easily obtain useful information for system monitoring and management Still another object of the present invention is to provide a retrieval method and apparatus which allows effective operation and management of a transmission line system.

According to the present invention, a method for retrieving information related to a desired item from a database storing information which are collected from a system to be monitored, comprising the steps of:

displaying a plurality of states of the system in time sequence on screen of a display, wherein each of the states in represented by a plurality of items of collected information;

inputting a desired item of a state selected from the states displayed on the screen;

retrieving a state of the system from the database based on the desired item; and displaying a retrieved state on the screen.

Each of the states may be represented by kind of alert, type of device, and one of alert occurrence and restoration, wherein, when one of the alert occurrence and restoration is inputted as the desired item, another state having same kind of alert and same type of device as a selected state is retrieved from the database.

The system to be monitored may be a transmission system composed of two stations and a transmission line connecting the stations, wherein the database stores an alert information correspondence table between one station and the other station.

Each of the states may be represented by kind of alert including one of transmission error and reception error, type of device, one of the stations, and one of alert occurrence and restoration, wherein when one station in which one of the transmission error and the reception error occurs is inputted as the desired item, another state having the other of the transmission error and the reception error occurring in the other station is retrieved from the database by referring to the alert information correspondence table.

Each of the states may be represented by type of device, status before change, and status after change, wherein, when a status change is inputted as the desired item, another state having same type of device and some status change as a selected state is retrieved from the database.

The system may be a submarine cable system composed of at least one submarine cable, submarine repeater, submarine branching unit, and joint box.

According to anther aspect of the present invention, a method for retrieving information related to a desired item from a database storing information about a submarine cable system composed of at least one submarine cable, submarine repeater, submarine branching unit, and joint box, comprising the steps of:

displaying a current state of the submarine cable system on screen of a display, wherein the current state is represented by collected information from the submarine cable system;

designating a component of the submarine cable system displayed on the screen;

retrieving information related to the designated component from the database; and displaying retrieved information on the screen.

The designated component may be a component which encounters abnormal conditions. The component which encounters abnormal conditions is preferably displayed in a different way to indicate occurrence of cable cutting.

BRIEF DESCRIPTION OF THE DRAWINGS

FIGS. 2A–2C are diagrams showing journal tables displayed on screen for explanation of retrieval sequence according to a first embodiment of the present invention;

FIGS. 5A–5C are diagrams showing journal tables displayed on screen for explanation of retrieval sequence according to a second embodiment of the present invention;

FIGS. 6A–6D are diagrams showing journal tables displayed on screen for explanation of retrieval sequence according to a third embodiment of the present invention;

FIGS. 7A–7C are diagrams showing journal tables displayed on screen for explanation of retrieval sequence according to a fourth embodiment of the present invention;

FIG. 8A is a diagram showing a schematic system configuration displayed on screen in a first step of retrieval sequence according to a fifth embodiment of the present invention;

FIG. 8B is a diagram showing a schematic system configuration displayed on screen in a second step of retrieval sequence according to the fifth embodiment;

FIG. 9A is a diagram showing a schematic system configuration displayed on screen in a first step of retrieval sequence according to a sixth embodiment of the present invention;

FIG. 9C is a diagram showing the details of system information displayed on screen in a third step of retrieval sequence according to the sixth embodiment;

FIG. 10B is a diagram showing a schematic system configuration displayed on screen in a second step of retrieval sequence according to the seventh embodiment; and FIG. 10C is a diagram showing the details of system information displayed on screen in a third step of retrieval sequence according to the seventh embodiment.

DETAILED DESCRIPTION OF THE PREFERRED EMBODIMENTS

Figure 1:
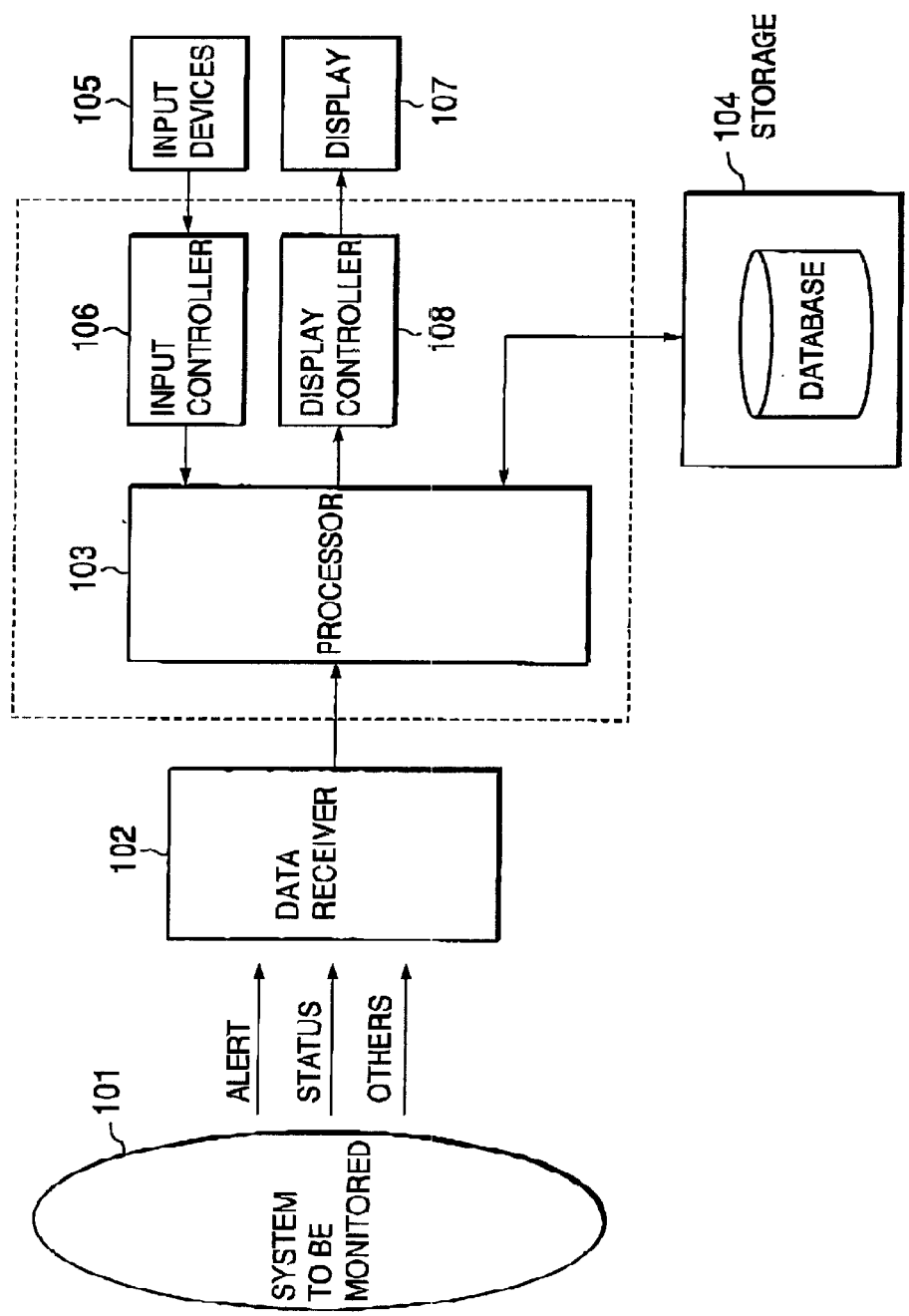
FIG. 1 is a block diagram showing a monitor system employing an information retrieval method according to the present invention.

Referring to FIG. 1, a monitoring system according the present invention receives data items including alert data, status data, and other measured numerical data from a system 101 to be monitored. The system 101 may be a transmission system such as a submarine cable system as described later. The monitoring system s provided with a data receiver 102, which collects the data items from the system 101. The received data items are output to a processor 103, which may be a program-controlled processor such as a central processing unit (CPU) or a digital signal processor (DSP).

The processor 103 has a data storage 104 connected thereto. The data storage 104 which may be a hard disk, a removable disk, or the like stores a database which retrievably stores collected data items in time sequence. The database of the storage 104 may be divided into a plurality of databases, for example, alert occurrence database, alert restoration database, other-station database, and status change database.

An input device 105 including a pointing device and a keyboard is connected to the processor 103 through an input controller 106. A display 107 is connected to the processor through a display controller 108.

A retrieval program according to the present invention is stored in a memory (not shown) and runs on the processor 103 to perform the retrieval using a corresponding database depending on an input instruction through the input device 105. The retrieval result is displayed in a desired form on the display 107.

First Embodiment

There will be described hereafter the case where the database of the storage 104 includes the alert occurrence database.

As shown in FIG. 2A, a journal table having predetermined fields is displayed in a window A1 on the screen of the display 107. The fields are Time, Kind of Alert, Type of Device, and Occurrence/Restoration. Pieces of collected data are each displayed as system states in time sequence. Here, it is assumed that seven pieces of collected data, DATA 1001–1007, are displayable in the window A1. In this state, consider the case where the latest system information is collected and inputted to the processor 103

As shown in FIG. 2B, when receiving the latest collected information indicating that the device of type "a" has been restored from the alert of "A" at 12:30, the data, DATA 1008, is added to the top of the Journal table in the window Al on the screen of the display 107. When an operator uses the input device 105 to select the DATA 1008 by a highlight bar or a special symbol such as asterisk "*" and then right-clicks or double-clicks on the row of the DATA 1008, a pull-down menu A2 including predetermined search items is displayed on the screen as shown in FIG. 2B.

When an item of "Occurrence" is selected from the pull-down menu A2, the processor 103 starts the retrieval program and searches the alert occurrence database of the storage 104 for data having the same kind of alert "A" and the same type of device "a" as the DATA 1008. If a hit is found in the same window A1, the found data row of the journal table is shown by a highlight bar or a special symbol such as asterisk "*a".

As shown in FIG. 2C, in the case where DATA 1001 is found as the data having the same kind of alert "A" and the same type of device "a" as the DATA 1008, the row of DATA 1001 is highlighted. In this manner, the operator can know that an alert having the same kind of alert "A" and the same type of device "a" occurred at 11:20

Figure 3:
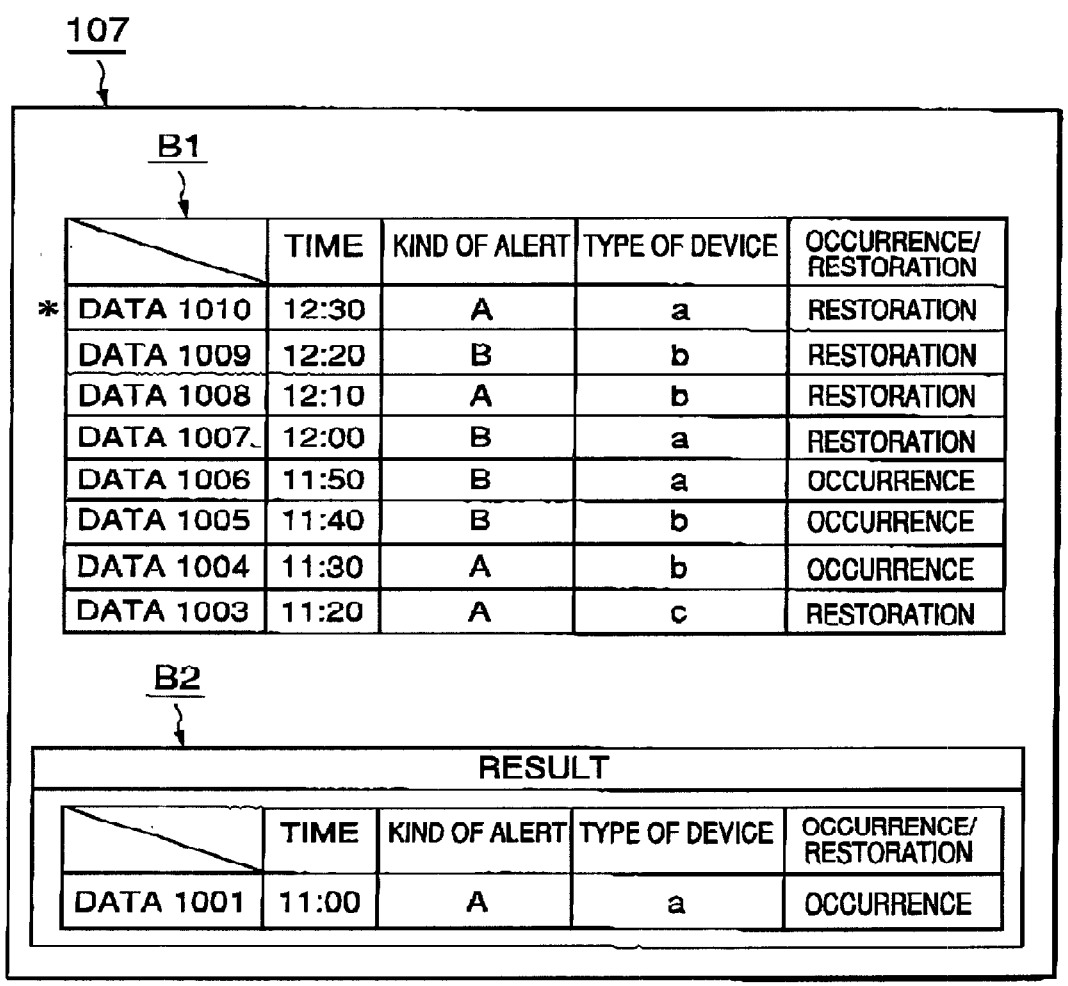
FIG. 3 is a diagram showing another example of journal table displayed on screen according to the embodiment.

As shown in FIG. 3, in the case where a hit is found out of the window B1 displaying seven past pieces or collected data, another window B2 is created on the same screen and the retrieval result is displayed in the window B2.

Figure 4:
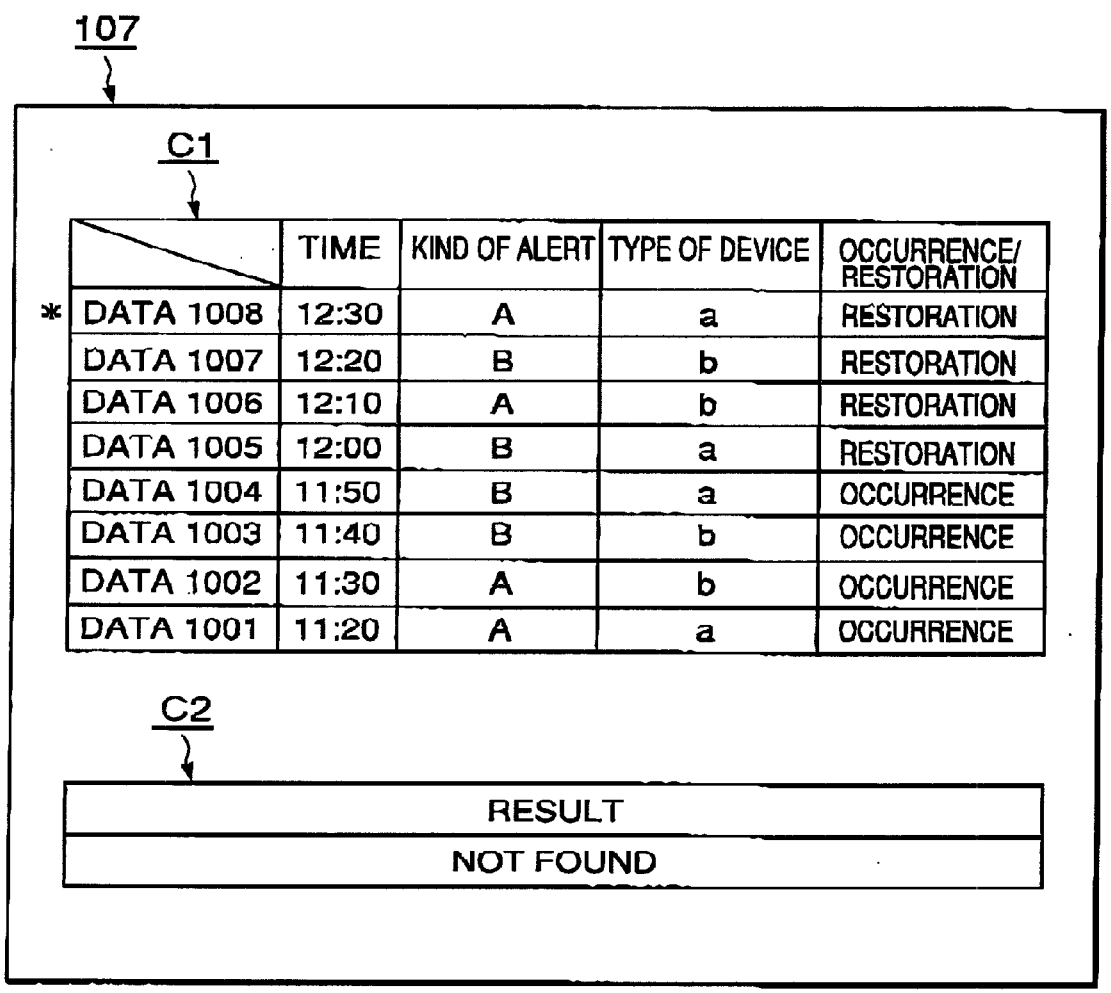
FIG. 4 is a diagram showing an example of journal table displayed on screen when not found.

As shown in FIG. 4, in the case where no hit is found in the alert occurrence database, another window C2 is created on the same screen and the retrieval result is displayed in the window C2.

Second Embodiment

There will be described hereafter the case where the database of the storage 104 includes the alert restoration database, As shown in FIG. 5A, a journal table having predetermined fields is displayed in a window D1 on the screen of the display 107. The fields are Time, Kind of Alert, Type of device, and Occurrence/Restoration. Pieces of collected data are each displayed as system states in time sequence. Here, it is assumed that six pieces of collected data, DATA 2001–2006 are displayable in the window D1. In this state, consider the case where the latest system information is collected and inputted to the processor 103.

As shown in FIG. 5B, when receiving the latest collected information indicating that the alert of "B" occurs in the device of type "b" at 13:00, the data, DATA 2007, is added to the top of the journal table in the window D1 on the screen of the display 107. When an operator uses the input device 105 to select the DATA 2007 by a highlight bar or a special symbol such as asterisk "*" wand then right-clicks or double-clicks on the row of the DATA 2007, a pull-down menu D2 including predetermined search items is displayed on the screen as shown in FIG. 5B When an item of "Restoration" is elected from the pull-down menu D2, the processor 103 starts the retrieval program and searches the alert restoration database of the storage 104 for data having the same kind of alert "B" and the same type of device "b" as the DATA 1008. If a hit is found in the same window A1, the found data row of the journal table is shown by a highlight bar or a special symbol such as asterisk "*", As shown in FIG. 5C, in the case where DATA 2003 is found as the data having the same kind of alert "B" and the same type of device "b" as the DATA 2007, the row of DATA 2003 is highlighted. In this manner, the operator can know that an alert having the same kind of alert "B" and the same type of device "b" was restored at 11:00.

Third Embodiment

There will be described hereafter the case where the database of the storage 104 includes the other-station database which includes an alert information correspondence table between each station and the other station which are linked through a transmission line.

As shown in FIG. 6A, a journal table having predetermined fields is displayed in a window E1 on the screen of the display 107 The fields are Time, Kind of Alert, Type of device, Station, and Occurrence/Restoration. Pieces of collected data are each displayed as system states in time sequence. Here, it is assumed that eight pieces of collected data (here, DATA 3001–3008) are displayable in the window E1. In this state, consider the case where a desired data is selected to search the other-station database.

As shown in FIG. 6B, when an operator uses the input device 105 to select the DATA 3002 by a highlight bar as indicated by asterisk "*" and then right-clicks or double-clicks on the row of the DATA 3002, a pull-down menu E2 including predetermined search items is displayed on the screen as shown in FIG. 6B.

When an item of "Other station" is selected from the pull-down menu E2, the processor 103 starts the retrieval program and searches the other-station database of the storage 104 using items related to the kind of alert "Reception error" and the station "Self" of the DATA 3002.

As shown in FIG. 6C, by referring to the alert information correspondence table stored in the other-station database, it is known that the reception error at the "Self" station is caused by one of the following alerts at the other station; transmission error; transmission line fault; transmission output shutoff; transmission optical output shutoff; transmission clock shutoff; and transmitter problem. Here, the case where the reception error at its own station is caused by transmission error at the other station is retrieved and displayed by a highlight bar as indicated by asterisk "*". If the reception error at its own station is not caused by transmission error at the other station but its own receiver fault, then no row is highlighted.

A shown in FIG. 6D, after closing the alert information correspondence table as shown in FIG. 6C, the found data row of the journal table is shown by a highlight bar as indicated by asterisk "*". In this case, the row of DATA 3001 is highlighted. In this manner, the operator can know that the alert "Reception errors" at its own station and the alert "Transmission error" at the other station occurred simultaneously at 12:00. In other words, it is found that the alert "Reception error" at its own station was caused by the alert "Transmission error" at the other station.

Fourth Embodiment

There will be described hereafter the case where the database of the storage 104 includes the status change database.

As shown in FIG. 7A, a journal table having predetermined fields is displayed in a window F1 on the screen of the display 107. The fields are Time, Type of device. Status before change, and Status after change. Pieces of collected data are each displayed as system states in time sequence. Here, it ie assumed that eight pieces of collected data, DATA 4001–4008, are displayable in the window F1. In this state, consider the case where a desired data is selected to perform status change retrieval.

As shown in FIG. 7B, when an operator uses the input device 105 to select the DATA 4008 by a highlight bar or a special symbol such as asterisk "*" and then right-clicks or double-clicks on the row of the DATA 4008, a pull-down menu F2 including predetermined search items is displayed on the screen as shown in FIG. 7B When an item of "Status changes" is selected from the pull-down menu F2, the processor 103 starts the retrieval program and searches the status change database of the storage 104 for data having the same type of device "c" and the same status change from "A" to "B" au the DATA 4008. If a hit is found in the same window F1, the found data row of the journal table is shown by a highlight bar or a special symbol such as asterisk "*".

As shown in FIG. 7C, more specifically, in the case where DATA 4001 is found as the data having the same type of device "c" and the same status change from "A" to "B" as the DATA 4008, the row of DATA 4001 is highlighted. In this manner, the operator can know that the same status change as the DATA 4008 occurred in the same device "c" at 11:20.

Fifth Embodiment

The present invention can be also applied to a transmission system oh as a submarine cable system as described in the following embodiments. In these embodiments, the system 101 of FIG. 1 is the submarine cable system composed of a plurality of submarine cables, repeaters, branching units, joint boxed, and land-based stations. The database of the storage 104 may be divided into a plurality of databases, for example, submarine cable database, submarine repeater database, and submarine branching unit database.

There will be described hereafter the case where the database of the storage 104 includes the submarine cable database storing alert information, status information, and other necessary numerical information about submarine cables, repeaters, branching units, and joint boxes which are included in a designated submarine section. Further the submarine cable database has predetermined fields which are used for retrieval; cable length, cable type, depth of water, cutting location of a designated section, storage location for a spare cable, address or phone number of the storage location, schedule of chartered ship, estimated time period period for restoration and the like. The submarine cable database can be used to display desired information in a desired form on the display 107. For example, in the case where the submarine cable is cut due to any cause, the monitoring system receives alert signals from land-based stations involved in the cut cable and displays desired information in a desired form on the display 107. The details will be described hereinafter.

As shown in FIG. 8A, a cable system configuration of a designated section is displayed in a window G1 or full screen on the display 107. More specifically, the displayed cable system is composed of two terminal stations 11 and 12, submarine cables 81–83 connecting the stations 11 and 12 through two repeaters 91 and 92. Here, consider the case where the submarine cable 82 is cut and thereby alert signals are transmitted from the stations 11 and 12 to the monitoring system.

As shown in FIG. 8B, when receiving the alert signals from the stations 11 and 12, the alert signals indicating that the submarine cable 82 is cut, the processor 103 controls the display controller 108 such that the displaying color of the submarine cable 82 changes from normal to alert. In this alert state, when an operator uses the input device 105 to select the submarine cable 82 and then right-clicks or double-clicks on that section, a pull-down menu G2 including predetermined search items is displayed on the screen as shown in FIG. 8B. Here, the search items are "All", "Length of submarine cable", "Type of submarine cable", "Depth of water at which cable in laid", "Location of cutting". "Spare cable information", and "Other information".

When an item of "All" is selected from the pull-down menu G2, the processor 103 starts the retrieval program and searches the submarine cable database of the storage 104 for all data regarding the submarine cable 82. The retrieved data items are sent back to the processor 103 and the details of the submarine cable 82 are displayed in a predetermined form on the display 107, for example, as shown in FIG. 8C.

Figure 8C:
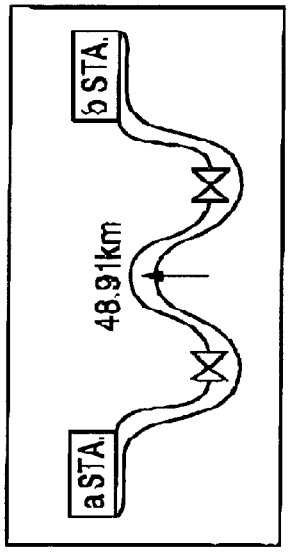
FIG. 8C is a diagram showing the details of system information displayed on screen in a third step of retrieval sequence according to the fifth embodiment.

Referring to FIG. 8C, more specifically, the detailed information of the submarine cable 82 is divided into four section: cable, fault location, spare cable, and other information. In the section of cable, the following items are displayed: length of cable; type of cable; depth of water; and location or cable cutting. In the section of fault location, a schematic figure showing the location where the cable 82 is cut is displayed in the section of spare cable, the following items are displayed: length of cable; type of cable; storage location; and phone number of the storage location. In the section of other information, the following items are displayed: schedule for chartered ship, estimated time required for restoration, and other information. Further, when clicking on an item, for example, "length of cable", the details of the clicked item may be displayed.

Sixth Embodiment

There will be described hereafter the case where the database of the storage 104 includes the submarine repeater database.

As shown in FIG. 9A, a cable system configuration of a designated section is displayed in a window H1 or full screen on the display 107. More specifically, the displayed cable system is composed of two terminal stations 11 and 12, submarine cables 81–83 connecting the stations 11 and 12 through two repeaters 91 and 92. Here, consider the case where the repeater 91 encounters abnormal conditions and thereby alert signals are transmitted from the stations 11 and 12 to the monitoring system.

Figure 9B:
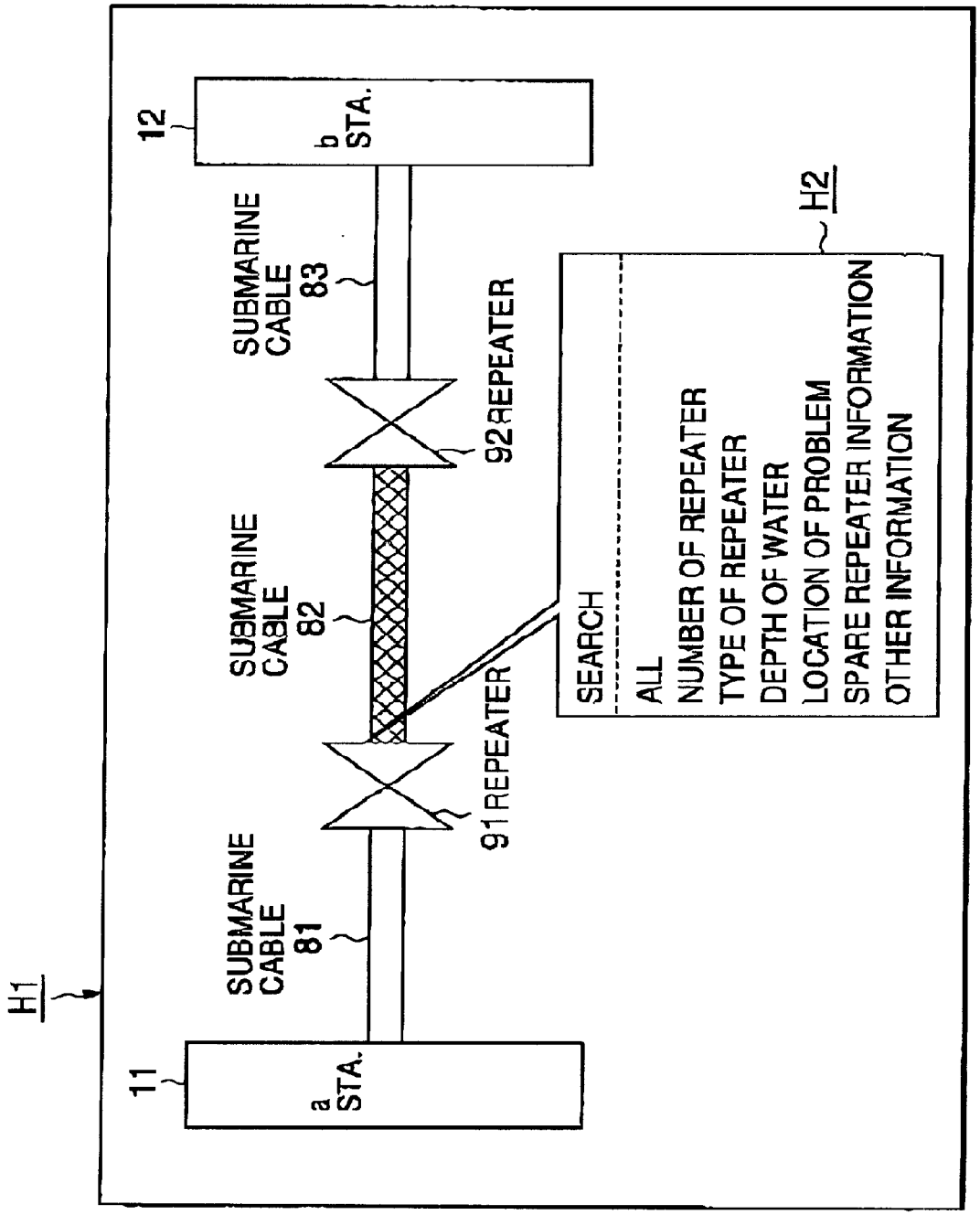
FIG. 9B is a diagram showing a schematic system configuration displayed on screen in a second stop of retrieval sequence according to the sixth embodiment.

As shown in FIG. 9B, when receiving the alert signals from the stations 11 and 12, the alert signals indicating that the repeater 91 is out of order, the processor 103 controls the display controller 108 such that the displaying color of the repeater 91 changes from normal to alert. In this alert state, when an operator uses the input device 105 to select the repeater 91 and then right-clicks or double-clicks on that section, a pull-down menu H2 including predetermined search items is displayed on the screen as shown in FIG. 9B. Here, the search items are "All". "Number of repeater", "Type of repeater", "Depth of water at which repeater is laid", "Location of problem". "Spare repeater information", and "Other information".

When an item of "All" is selected from the pull-down menu H2, the processor 103 starts the retrieval program and searches the submarine repeater database of the storage 104 for all data regarding the submarine repeater 91. The retrieved data items are sent back to the processor 103 and the details of the submarine repeater 91 are displayed in a predetermined form on the display 107, for example, as shown in FIG. 9C.

Referring to FIG. 9C, more specifically, the detailed information of the submarine repeater 91 to divided into four sections: repeater, fault location, spare repeater, and other information. In the section of repeater, the following items are displayed: number of repeater; type of repeater; depth of water; and location of problem. In the section of fault location, a schematic figure showing the location where the repeater 91 is laid is displayed. In the section of spare repeater, the following items are displayed: number of spare repeater; type of spare repeater; characteristics of spare repeater; and storage location; and phone number of the storage location. In the section of other information, the following items are displayed: schedule of chartered ship, estimated time required for restoration, and other information. Further, when clicking on an item, for example, "number of repeaters", the details of the clicked item may be displayed Seventh Embodiment There Will be described hereafter the case where the database of the storage 104 includes the submarine branching unit database.

Figure 10A:
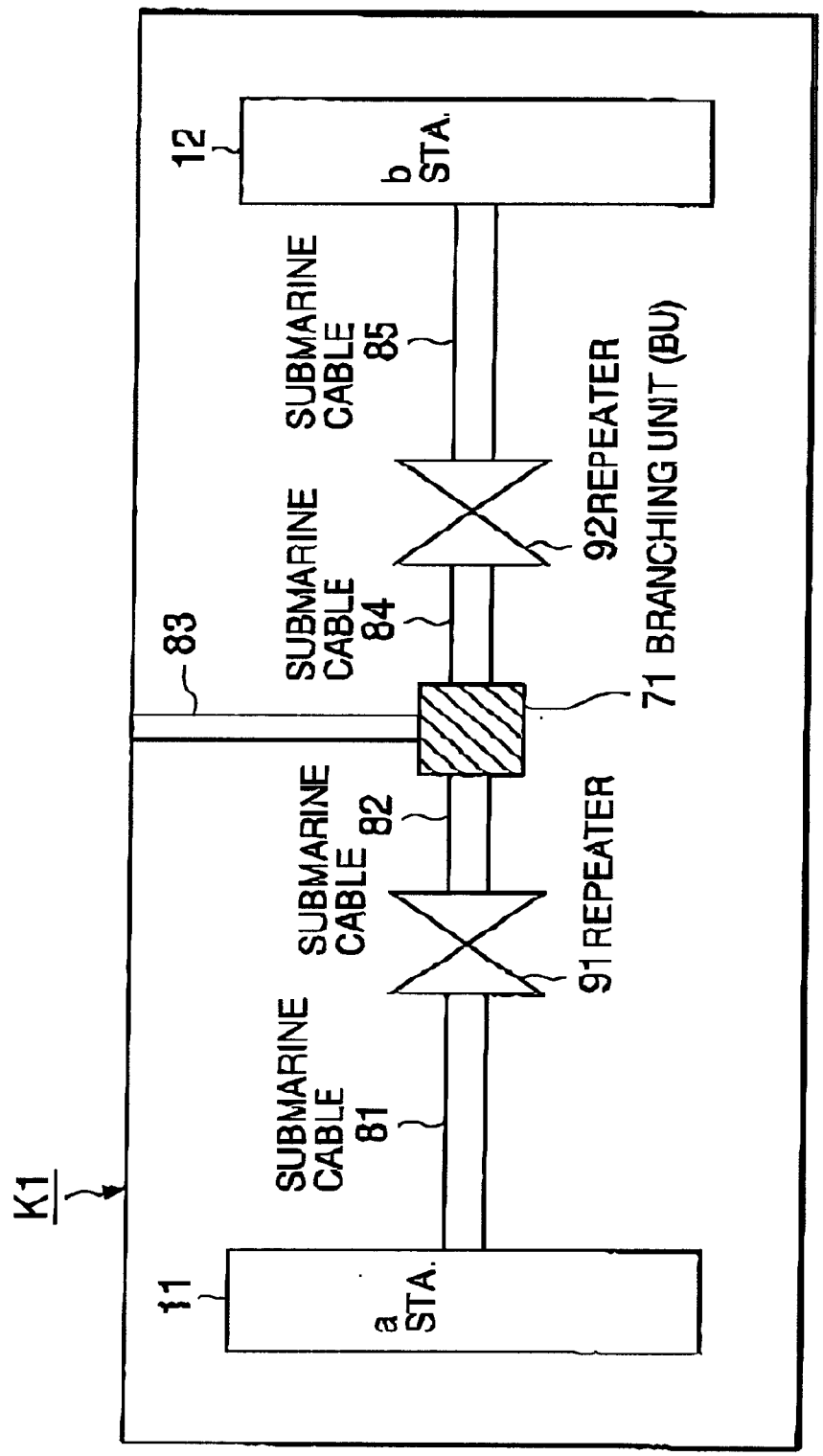
FIG. 10A is a diagram showing a schematic system configuration displayed on screen in a first step of retrieval sequence according to a seventh embodiment of the present invention.

As shown in FIG. 10A, a cable system configuration of a designated section is displayed in a window K1 or full screen on the display 107. More specifically, the displayed cable system is configured such that a terminal station 11 is connected to a branching unit (BU) 71 through a repeater 91 connecting submarine cables 81 and 82 and further the BU 71 connected to submarine cables 83 and 84 is connected to a station 12 through a repeater 92 connecting the submarine cable 84 and a submarine cable 85. Here, consider the case where the BU 71 encounters abnormal conditions and thereby alert Signals are transmitted from the stations 11 and 12 to the monitoring system.

As shown in FIG. 10B, when receiving the alert signals from the stations 11 and 12, the alert signals indicating that the BU 71 is out of order, the processor 103 controls the display controller 108 such that the displaying color of the BU 71 changes from normal to alert. In this alert state, when an operator use, the input device 105 to select the BU 71 and then right-clicks or double-clicks on that section, a pull-down menu K2 including predetermined search items is displayed on the screen as shown in FIG. 10B. Here, the search items are "All", "Number of BU", "Type of BU", "Depth of water at which BU is laid", "Location of problem", "Spare BU information", and "Other information".

When an item of "All" is selected from the pull-down menu K2, the processor 103 starts the retrieval program and searches the submarine BU database of the storage 104 for all data regarding the submarine BU 71. The retrieved data items are sent back to the processor 103 and the details of the BU 71 are displayed in a predetermined form on the display 107, for example, as shown in FIG. 10C.

Referring to FIG. 10C, more specifically, the detailed information of the BU 71 is divided into four sections: BU, fault location, spare BU, and other information. In the section of BU, the following items are displayed: number of BU; type of BU; depth of water; and location of problem. In the section of fault location, a schematic figure showing the location where the BU 71 is laid is displayed. In the section of spare BU, the following items are displayed; number of spare BU; type of spare BU; characteristics of spare BU; and storage location; and phone number of the storage location. In the section of other information, the following items are displayed schedule of chartered ship, estimated time required for restoration, and other information. Further, when clicking on an item, for example, "number of BU", the details of the clicked item may be displayed.

Additional advantages and modifications will readily occur to those skilled in the art Therefore, the present invention in its broader aspects is not limited to the specific details shown and described herein. For example, the invention can be also applied to displaying detailed information about a spare device. Further, it is possible to display chartered ship schedule and estimated time period required for restoration on a desired window in the screen of the display 107. Furthermore, any combination of the first through seventh embodiments can be readily made for those skilled in the art.

Accordingly, various modifications may be made without departing from the spirit or scope of the general inventive concept as defined by the appended claims and their equivalents.

What is claimed is:

1. A method for retrieving information related to a desired item from a database storing information about a submarine cable system composed of at least one submarine cable, submarine repeater, submarine branching unit, and joint box, comprising the steps of:

displaying a current state of the submarine cable system on screen of a display, wherein the current state is represented by collected information from the submarine cable system;

designating a component of the submarine cable system displayed on the screen, which encounters abnormal conditions in a different way to indicate occurrence of cable cutting;

retrieving information related to the designated component from the database;

displaying retrieved information on the screen; wherein when a desired menu item including "All" is selected for the designated component, then at least one of detailed information of the designated component is displayed on the screen including a spare component to replace the designated component with, a schematic illustration showing a location of problem and other information depending on the desired menu item.

* * * * *